US008213679B2

(12) United States Patent
Yao

(10) Patent No.: US 8,213,679 B2
(45) Date of Patent: Jul. 3, 2012

(54) METHOD FOR MOVING TARGETS TRACKING AND NUMBER COUNTING

(75) Inventor: Wei Yao, Shanghai (CN)

(73) Assignee: Shanghai Yao Wei Industry Co. Ltd., Shanghai (CN)

( * ) Notice: Subject to any disclaimer, the term of this patent is extended or adjusted under 35 U.S.C. 154(b) by 452 days.

(21) Appl. No.: 12/509,106

(22) Filed: Jul. 24, 2009

(65) Prior Publication Data

US 2010/0021009 A1 Jan. 28, 2010

Related U.S. Application Data

(63) Continuation of application No. PCT/CN2008/070048, filed on Jan. 9, 2008.

(30) Foreign Application Priority Data

Jan. 25, 2007 (CN) .......................... 2007 1 0036809

(51) Int. Cl.
*G06K 9/00* (2006.01)

(52) U.S. Cl. ........ 382/103; 382/100; 382/167; 382/173; 382/177; 348/169; 348/208.14; 348/208.6

(58) Field of Classification Search .................. 382/100, 382/103, 167, 173, 177; 348/169, 208.14, 348/208.6
See application file for complete search history.

(56) References Cited

U.S. PATENT DOCUMENTS

| 6,724,915 | B1 * | 4/2004 | Toklu et al. | 382/103 |
|---|---|---|---|---|
| 7,596,241 | B2 * | 9/2009 | Rittscher et al. | 382/103 |
| 7,602,944 | B2 * | 10/2009 | Campbell et al. | 382/103 |
| 2007/0003141 | A1 * | 1/2007 | Rittscher et al. | 382/181 |

OTHER PUBLICATIONS

Zhao, Min, "Automatic Passenger Counting Based on Multi-Objects Recognition," Dec. 7, 2006, Master Degree Dissertation of Chongqing University, Control Theory and Control Engineering, pp. 28-36, 48-52.*
Tian Jing Lei et al. "Research on Video Based Counting System for Flow of Passengers" National Conference of Image and Graphic Technology., Institue of Signal and Image Processing, Dalian Maritime University ("A Collection of the Papers of the 12th National Conference of Image and Graphic Technology") 2005. ISBN: 7302119309.
Fu Xiao Wei, "A Multi-target Counting Method Based on Dynamic Images" Master's degree paper. Institute of Information Science and Engineering of Wu Han Science and Technology University. Apr. 2003. 71 pages.

* cited by examiner

*Primary Examiner* — Andrew W Johns
*Assistant Examiner* — Shefali Goradia
(74) *Attorney, Agent, or Firm* — Dorsey & Whitney LLP

(57) ABSTRACT

The invention discloses a method for moving targets tracking and number counting, comprising the steps of: a). acquiring continuously the video images comprising moving targets; b). acquiring the video image of a current frame, and preprocessing the video image of the current frame; c). segmenting the target region of the processed image, and extracting the target region; d). matching the target region of the current frame obtained in step c) with that of the previous frame based on an online feature selection to establish a match tracking link; and e). determining the number of the targets corresponding to each match tracking link based on the target region tracks recorded by the match tracking link. The invention can solve the problem of low precision of the number statistic results caused by the bad environment, such as that the distribution of the illumination is extremely not equilibrium spatially, the change in a time period is complicated, the change of the gesture during the people goes by is evident, and the like, under the normal application condition.

13 Claims, 6 Drawing Sheets

METHOD FOR MOVING TARGETS TRACKING AND NUMBER COUNTING

CROSS-REFERENCES TO RELATED APPLICATIONS

This application is a continuation of International Patent Application No. PCT/CN2008/070048, filed on Jan. 9, 2008, which claims priority to Chinese Patent Application No. 200710036809.X, filed on Jan. 25, 2007, the entire contents of both of which are incorporated herein by reference.

FIELD OF THE INVENTION

The present invention relates to a method for tracking moving targets and for counting the number thereof, and particularly relates to a method for tracking moving targets and for counting the number based on image recognition technology.

BACKGROUND OF THE INVENTION

At places such as entries of stores, museums, exhibition halls, gymnasiums etc., entries of long passages of escalators and corridors in the buildings, and doors of passenger vehicles for getting on or off, the amount of the people entering and leaving at a certain time point or in a time period is required to be counted, and the services can be optimized and the management level can be improved based on the statistic data. The statistic method for counting the number of the people based on the photoelectric technology cannot be accepted by users because the statistic precision is low, and the image cannot be stored for manually counting afterwards.

Recently, some researches on counting the number of people based on image recognition technology has been developed. In these systems, it is assumed normally that the background in the working scene of the camera is basically constant, the illumination is constant during a long period of time, the distribution of the illumination is basically equilibrium spatially, whether the people is present or not does not effect the illumination for the operation of the camera, the people present actively some single features, and the gesture of the human body in the visual field of the camera basically does not change significantly.

For example, an image statistic system for counting the client flow rate in a store has been publicized in a master's degree paper "A Multi-target Counting Method Based on Dynamic Images" written by Fu Xiao Wei of Institute of Information Science and Engineering of Wu Han Science and Technology University. As shown in the flow chart of the system in FIG. 1, it comprises the steps of: acquiring dynamic image 11, detecting the movement 12, classifying the targets and extracting the features 13, tracking multiple targets 15, counting the targets 15, etc. In the system, the moving target region is segmented by using the methods, such as the difference between frames, the difference between backgrounds, and adaptive threshold, and the head area of a human body is extracted by using image filtering, image segmenting, morphologic processing and features statistic, and the tracking and counting of multiple targets are performed by using a feature tracking method. The subject studied by the author of the paper is counting the client flow rate of the store, however, the author of the paper only simulated in the laboratory a simple condition that the people pass by. There is significant difference between the simple simulated condition in the laboratory and the complicated condition at the entries and exits of the store where the people goes in and out, and the multi-target counting method publicized in the paper can only accomplish the multi-target recognition and counting of the multiple targets in a simulated site in the laboratory, while it is unable to manage the statistic task of the client flow rate in a store under a practical application condition. Furthermore, the problems, such as that the distribution of the illumination is extremely not equilibrium spatially, the change in a time period is complicated, the change of the gesture during the people goes by is evident, and the like, have not been considered in counting the people flow rate at the entries and exits. Under the conditions that the distribution of the illumination is extremely not equilibrium spatially, the change in a time period is complicated, not only large difference exists between the target and the background, but also large difference exists among the backgrounds exists. It is difficult to detect the moving area under such complicated condition by using the method publicized in the paper. In many applications similar to the situation that the passengers get on or off a vehicle, the change of the gesture is significant during the people passing by, the head of a human body may often be sheltered, sometimes. It cannot be distinguished whether a person is in a certain area or not by extracting simply the feature of the head of a person. Because the illumination changes significantly, the change of the feature is evident, and it is difficult to track correctly multiple-targets by using a single feature tracking method.

In a paper "A Study on Passenger Flow Rate Counting System Based on Video" is publicized on the National Conference of Image and Graphic Technology, 2005, by Tian Jing Lei of Signal and Image Processing Institute of Da Lian Maritime University ("A Collection of the Papers of the 12th National Conference of Image and Graphic Technology", the author: Zhang Yu Jin, ISBN: 7302119309), a passenger flow rate counting system based on video is discussed in the paper, as shown in the flow chart of the system in FIG. 2. It comprises the steps of: acquiring the video 21, motion segmenting 22, recognizing the target 23, tracking the target 24, counting 25, etc. In this paper, a method of image frame difference is used to complete motion segmenting 22; recognizing the target 23 is performed by a Fuzzy C Mean (FCM) using Cluster method upon the parameters, such as the area, length, and width of the motion area, and by using a cluster method of fuzzy C—the mean (FCM); tracking the target 24 is performed by using a centroid based method; human body counting 25 is performed by deciding whether the moving target traverses two preset counting lines or not based on the positions of the center points of two successive frames. Similar to that publicized in the above master's degree paper, the present method for extracting the moving target publicized in the paper is similar as that publicized in the above master's degree paper, both uses a simple method of frame difference. The only difference is that difference between three frames is utilized substituting the difference between two frames. Therefore, under the condition that the distribution of the illumination is extremely not equilibrium spatially, the change is complicated in a time period, the detection of the human body area cannot be performed correctly. Only a simple condition of a indoor room passage is discussed for the system, however, the complicated problems existing at the entries and exits under normal application conditions, such as that the distribution of the illumination in the operation working region of the camera traversing from inside the room to the outside is extremely not equilibrium spatially, the change in a time period is complicated, the change of the gesture during the people goes by is evident, and the like, have not been considered.

Similarly, the operation principles, the basic assumptions and the implementation methods of the other publicized systems for counting the number of the passengers based on image recognition are similar to the methods publicized in the above two papers. The problems of counting of the number of the passengers at entries and exits under normal application conditions, such as that the distribution of the illumination is extremely not equilibrium spatially, the change in a time period is complicated, the change of the gesture during the people go by is evident, and the like, cannot been solved.

SUMMARY OF THE INVENTION

A method for tracking moving targets and counting the number thereof provided in the invention intends to solve the low precision of the statistic results in the normal application condition caused by the bad environment, such as that the distribution of the illumination is extremely not equilibrium spatially, the change in a time period is complicated, the change of the gesture during the moving target (human body or other object) passes by is evident, and the like. The number counting method involved in the invention comprises not only counting the number of the targets passing a specified region, but also distinguishing whether each target enters or leaves when it passes by the specified region.

The technical scheme of the invention used to solve the above technical problems is to provide a method for tracking the moving targets and counting the number thereof, which comprises the steps of:

a). acquiring continuously video images comprising moving targets;

b). acquiring the video image of a current frame, and pre-processing the video image of the current frame;

c). performing target region segmenting upon the pre-processed image, and extracting a target region;

d). matching the target region of the current frame obtained in step c) with that of the previous frame based on an online feature selection to establish a match tracking link; and e). determining the number of the targets corresponding to each match tracking link based on the target region tracks recorded by the match tracking link.

The above method for tracking moving targets and for counting the number thereof also comprises a step f): acquiring the video images from step a) for each frame, performing step b)-step c), and accumulating the number of the targets corresponding to each tracking link.

In the above method for tracking moving targets and for counting the number thereof, the step of target region segmenting in step c) comprises:

c1). segmenting the pre-processed image into a plurality of separated first regions;

c2). computing the motion information of each of the first regions;

c3). determining and extracting motion regions based on the motion information;

c4). verifying whether each of the motion regions is a target region or not; and c5). extracting the verified target region.

Step c1) further comprises:

c11). segmenting the image into a plurality of second regions;

c12). computing the motion information of each of the second regions;

c13). computing the descriptive attribute information of each of the second regions;

c14). creating a region neighboring diagram based on the spatial position relationships among the second regions and the descriptive attribute information; and c15). combining the second regions into a first region based on the descriptive attribute information and the region neighboring diagram.

In step c11), the method for segmenting the image into a plurality of second regions comprises watershed segmentation algorithm and seed point region growing algorithm.

In step c11), the internal pixels in each of the second regions possess uniform pixel attribute, the pixel attribute comprising color, gradient strength, edge point or not, and edge response strength.

In step c12), the motion information in the second region comprises motion vector of the second region and the motion probability value of the edge pixels.

In step c13), the descriptive attribute information comprises:

first type attributes for characterizing the internal attribute of each second region comprising color distribution attribute, grey scale distribution attribute, and motion information attribute;

second type attributes for characterizing the difference between any two spatially adjacent second regions comprises a difference attribute of grey scale mean values, a difference attribute of color mean values, and a difference attribute of motion vectors, between the second regions;

third type attributes for characterizing a common edge feature between any two spatially adjacent second regions comprising gradient strength attribute, number of edge points, and motion probability attribute of the common edge points.

In step c14), the step of creating a region neighboring diagram further comprises:

representing each of the second regions with a node, and storing the first type attribute information in the node;

creating a bidirectional connecting arc between the nodes corresponding to two spatially adjacent second regions, and storing the second type and the third type information in the connecting arc;

obtaining a region neighboring diagram comprising a plurality of nodes and connecting nodes.

In step c15), the step of combining the second regions into the first region comprises:

under a restriction condition that the similarity of the second type, the third type attribute information reaches to a predetermined value, combining the second regions in a sequence according to the first type attribute information similarity from large to small, until the first type attribute information similarity is smaller than a predetermined value;

under a restriction condition that the similarity of the first type, the third type attribute information reaches to a predetermined value, combining the second regions in a sequence according to the second type attribute information similarity from large to small, until the second type attribute information similarity is smaller than a predetermined value; and under a restriction condition that the similarity of the first type, the second type attribute information reaches to a predetermined value, combining the respective second regions in a sequence according to the third type attribute information similarity from large to small, until the third type attribute information similarity is smaller than a predetermined value.

In the above method for tracking moving targets and for counting the number thereof, in step c4), the step of verifying whether each of the motion regions is target region or not uses a elastic matching method, wherein said elastic matching method comprises:

a training stage step: selecting a set of image regions of a quantity TrainSum which comprise target regions as a training image set, the training image set being represented by two dimensional array Accm[x][y], wherein x and y in the array are the horizontal coordinate and vertical coordinate of the pixels in the training image set, respectively. For each point P(x,y) in each training image, if it is located inside the target region, then the value of the element Accm[x][y] corresponding to two dimensional array Accm will be incremented by 1;

a motion region classifying step: setting an accumulator A for each of the motion regions, the initial value of which is set as A=0; for each of all of the pixel Q(x, y) in the motion region, the value of the array element Accm[x][y] corresponding to the pixel is added to the accumulator A to obtain an accumulated value, if the accumulated value>TrainSum*S*Threshold, and the total number of the pixels S conforms to Smin<S<Smax, then said region is a target region, otherwise, it is not a target region;

wherein the parameter Threshold indicates a critical coefficient for allowing to confirm a motion region being a target region, and Smin and Smax indicate the lower limit and the upper limit of the total number of the pixels in the target region, respectively.

In the above method for tracking moving targets and for counting the number thereof, step d further comprises:

d1). establishing a feature pool comprising a plurality of target features;

d2). for at least part of the features in the feature pool, computing the match degree between each of the target features of the respective target regions in the current frame and each of the target features of the respective target regions in the previous frame;

d3). computing a synthetic match degree measure between the respective target regions in the current frame and the respective target regions in the previous frame based on the match degrees;

d4). establishing a match mapping relationship between the target region in the current frame and a previous frame's target region having the maximum synthetic match degree measure with respect to that in the current frame; and d5). establishing a match tracking link comprising the target region in the current frame based on the match mapping relationship.

Wherein in step d3), the step of computing synthetic match degree measure comprising selecting a predetermined proportion of features in the feature pool, for which the match degree between the target region in the current frame and the target region in the previous frame are the highest, performing a weighted computation thereon, and obtaining the synthetic match degree measure between said two target regions.

Wherein in step d5), the step of establishing the match tracking link comprises:

finding the tracking link corresponding to the target region in the previous frame based on the match mapping relationship of step d4), and adding the target region in the current frame to the tracking link corresponding to the target region in the previous frame; and if the corresponding tracking link cannot be found in the previous frame, then establishing a new tracking link.

In the above method for tracking moving targets and for counting the number thereof, step e) further comprises:

for each not counted tracking link, deciding whether it is a tracking link suitable for counting based on the spatial displacement track of the target and the variation rule of the target size over time;

for each counted tracking link, verifying the accuracy of the counting result of the tracking link, if the previous counting of the tracking link is not consistent with the current counting, then using the current counting, meanwhile, modifying the previous counting result, until the tracking link leaves entirely from the image acquisition region.

In the above technical scheme of the invention, no any restrictions and assumptions are made for the application of counting the number, in the normal application condition, the conditions frequently occurring, such as that the distribution of the illumination is extremely not equilibrium spatially, the change in a time period is complicated, the change of the gesture during the moving target passes by is evident, and the like, have been considered. Under such application conditions, the image recognition technology is used as a core in the invention to solve the problem of the low precision statistic result of the number of the people under normal application conditions of bad environment, such as that the distribution of the illumination is extremely not equilibrium spatially, the change in a time period is complicated, the change of the gesture during the moving target passes by is evident. After practical operation and test, and counting the data, the accuracy of the count can be improved significantly in the invention.

BRIEF DESCRIPTION OF THE DRAWINGS

The features, performances of the invention can be further described by the following embodiments and the drawings.

DETAILED DESCRIPTION

Figure 1:
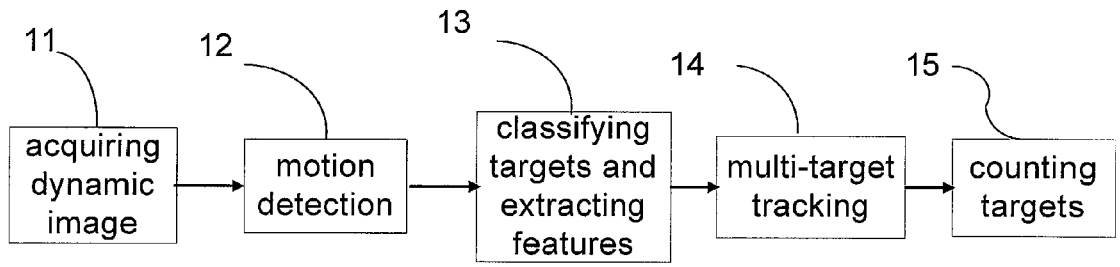
FIG. 1 is a flow chart of a multi-target recognition and count method based on the dynamic images.
Figure 2:
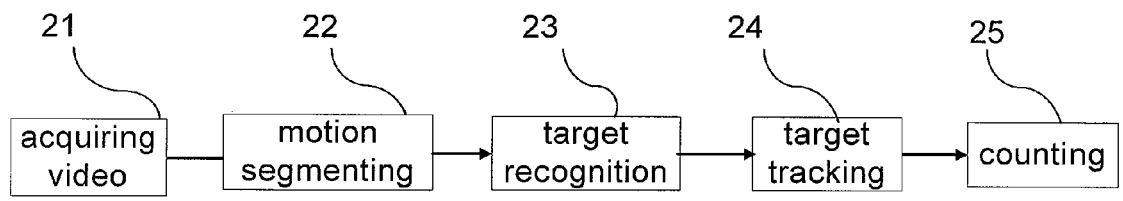
FIG. 2 is a flow chart of a video based passenger flow rate count system.
Figure 3:
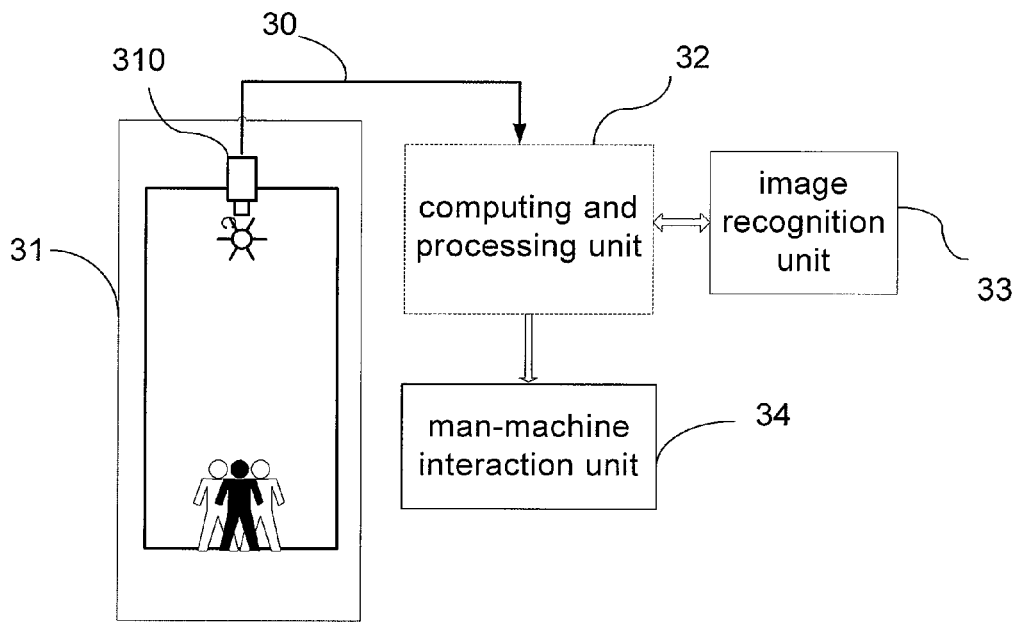
FIG. 3 is a structural schematic diagram of a counting system designed to implement the method for tracking moving targets and for counting the number thereof of the invention.

Referring to FIG. 3, a counting device 3 designed to realize the method for tracking moving targets and for counting the number thereof in the invention comprises: an imaging unit 31, a computing and processing unit 32, an image recognition unit 33, and a man-machine interaction unit 34. The imaging unit 31 comprises a camera 310, which is connected to the computing and processing unit 32 via a video connection wire 30. The image recognition unit 33 is normally an image processing software which is stored in a non-volatile storage (for example, hard disk) of the computing and processing unit 32, and which can be executed by the processor of the computing and processing unit 32. The man-machine interaction unit 34 comprises a man-machine interface, a data base for saving recognition results, an audible and visible alarm device, a data upload device, and the like.

As a particular embodiment of the invention, the counting device 3 as shown in FIG. 3 is installed on a passenger vehicle to count the number of the persons at the passageway of the vehicle. The passenger vehicle is a typical site where the distribution of the illumination is extremely not equilibrium spatially, the change in a time period is complicated, the change of the gesture during the people pass by is evident. The region monitored by the camera traverses from inside to outside of the room, the dynamic range of the spatial illumination is large, the distribution is not equilibrium seriously, the background illumination changes significantly before and after appearing a person, by using the publicized article in which the method based on the difference of the background is used to detect the motion region, high error rate may be obtained. The gesture of the passenger passing by the door of the vehicle changes significantly at any moment, which causes the tracked feature changes continuously. These methods for tracking human body by using a single feature or specific features in the respective publicized articles also have high error rate. While the solution proposed by the invention can overcome these two typical difficult problems for counting the number of the people.

The imaging unit 31 as shown in FIG. 3 is installed on the top portion of the vehicle above the center of the steps inside the vehicle door for the passengers to get on or off, disposed vertically and downwardly, or tilted slightly for a small angle toward the vehicle door to take downwardly real time images when the passengers get on or off the vehicle. The computing and processing unit 32 is installed at a position, where it is concealed and is easy to be operated, on the passenger vehicle. Based on practical experience of installation, the computing and processing unit 32 is installed normally in the cab. The analog image taken by the imaging unit 31 is converted to digital image by the computing and processing unit 32, then it is transmitted to the image recognition unit 33 on the non-volatile storage (for example, hard disk) installed in the computing and processing unit 32 to be computed by the image recognition unit 33 in real time. In an embodiment, in an image recognition unit 33 provided according to the invention, a CPU above 2.0 GHz is used as a computing core component of the computing and processing unit 32, and the computing speed can reach 8-10 frames/second. Under such a computing speed, it can be ensured substantially that all of the passengers can be detected correctly and tracked in real time. Under the condition that passenger vehicle is moving, the man-machine interaction unit 34 comprises normally a software interface for the driver and the steward to examine the statistic results, a data base for saving the recognition results, and an audible and visible alarm device. The man-machine interaction unit 34 is also installed at a position in the vehicle near the computing and processing unit 32.

Figure 4:
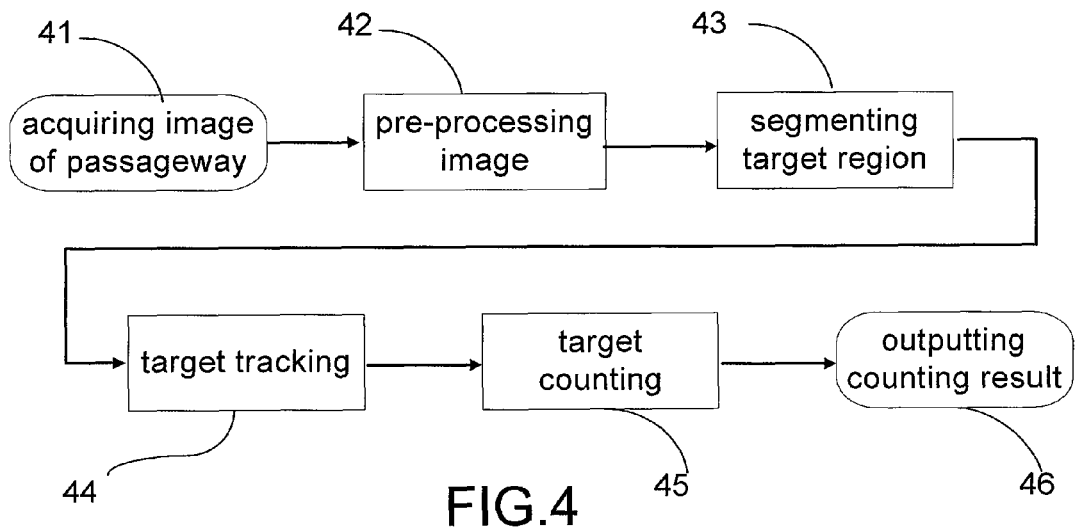
FIG. 4 is a flow chart of the method for tracking moving targets and for counting the number thereof in the invention.

The respective steps in the method for tracking moving targets and for counting the number thereof according to the invention will be described in detail as follows. Referring firstly to FIG. 4, the method comprises the steps of: acquiring passageway image 41, pre-processing image 42, segmenting target region 43, tracking target 44, counting target 45 and outputting counting result 46, wherein the step of acquiring passageway image 41 transmits the image taken by the imaging unit 31 to the image recognition unit 33, as described above.

The step of pre-processing image 42 may comprises filtering the image, converting the color space (for example, converting from RGB to HIS), computing the image gradient, computing the contrast threshold of image, making image gradient magnitude to be three values, suppressing non-maximum value of image gradient, extracting the edge, refining the edge, and connecting the edge, and the like. On the premise that the high efficiency of computation is ensured, any methods for filtering the image can be used, a 3×3 template is used firstly for median filtering in the invention, then a Gauss filtering of a small range template is used. After processing by the present step, each pixel possesses the following four attributes: color, gradient strength, whether an edge point or not, and edge response strength. The attributes required by the subsequent processing, such as color distribution attribute, grey scale distribution attribute, and gradient strength attribute, and the like, can also be obtained by present step.

Figure 5:
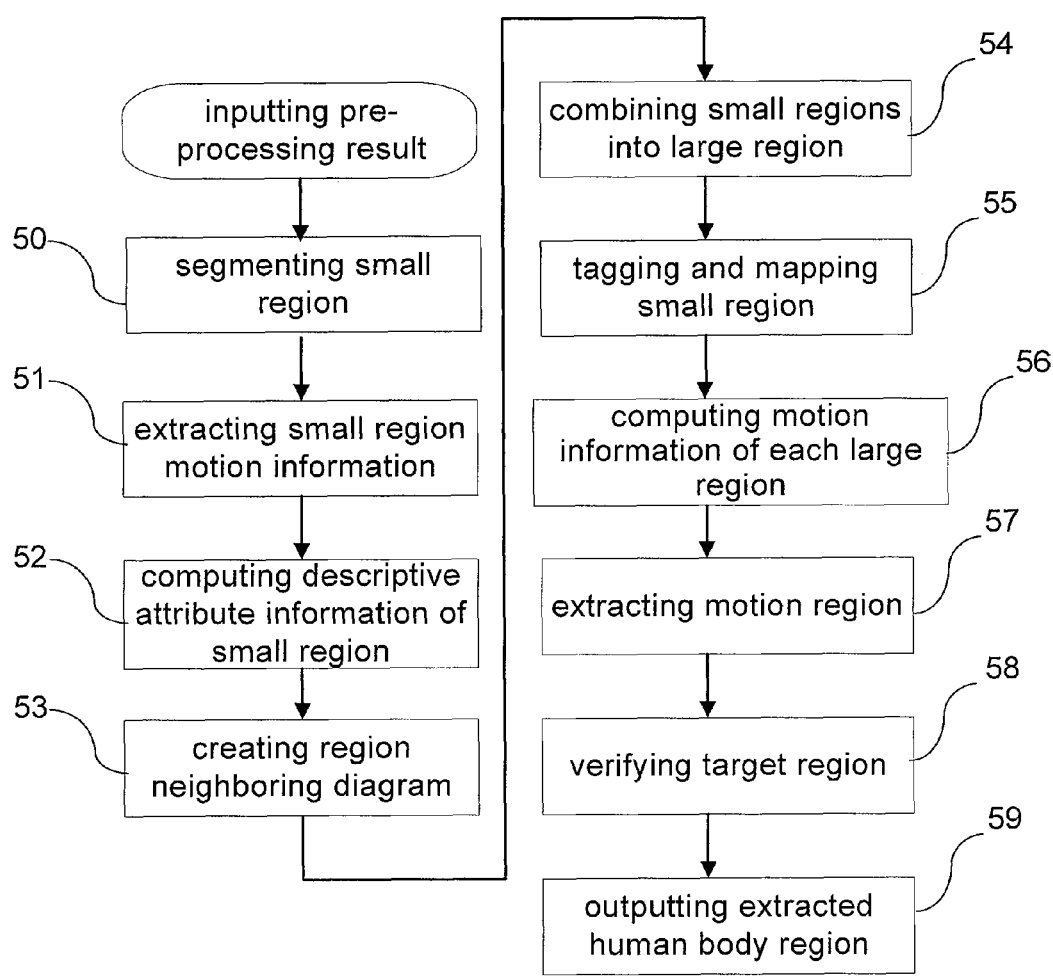
FIG. 5 is a flow chart of the step of segmenting the target region of FIG. 4.

The function of the step of segmenting the target region is to segment and extract the moving target (that is, a target of human body in the present embodiment, and hereinafter referred to as human body target) from the image. Referring now to FIG. 5, the present step further comprises the steps of:

A step of segmenting the image into a plurality of large regions (that is, first region) visually separated with each other, which is realized by the following steps 50~54.

Figure 6:
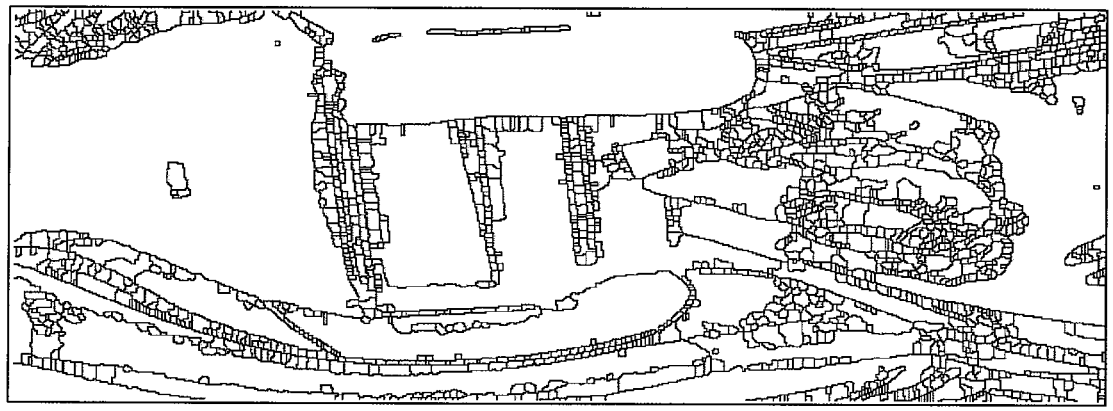
FIG. 6 is a schematic diagram of the step of segmenting a small region as shown in FIG. 5.

Step 50: segmenting small regions. The image is segmented into many (for example, about 3000) small regions (i.e. second regions) by using watershed segmentation method and seed point region growing method. As shown in FIG. 6, the pixels in each small region have entirely uniform pixel attributes, that is, the attributes, such as the color, the gradient strength, whether an edge point or not, and the edge response strength.

Step 51: extracting motion information of small regions (that is, the second regions), the motion information comprising both the motion vector of the small regions and the motion probability value of the edge pixels. The motion vector of a small region Ri is indicated by $Mv_i(Mv_x, Mv_y)$, wherein $Mv_x$ indicates a displacement of a small region i at the horizontal direction, and $Mv_y$ indicates displacement of the small region i at the vertical direction. The computation method of the motion vector $Mv_i(Mv_x, Mv_y)$ can be any conventional known methods with high computing efficiency, such as Full-search algorithm, three-step search algorithm, four-step search algorithm, and the like. Those methods are omitted herein. The motion probability value Mp(i) of the edge pixel point Bi(x,y) can be computed in two cases: if Bi(x,y) is not the edge point of an object, then Mp(i)=0.0; if Bi(x,y) is the edge point of an object, then the method for computing Mp(i) is as follows:

Assuming the total number of the image edge points in the current frame is T, an edge pixel point Ej(x,y)(i=0,1,...,T−1) which has a nearest spatial location to an edge pixel point of each object in the current frame is searched in the previous frame; the displacement of each edge pixel point at the horizontal direction is $Mv_x = xi - xj$, and the displacement at the vertical direction is $Mv_y = yi - yj$, the displacement value of the edge point can be obtained by synthesizing the displacements at the horizontal direction and at the vertical direction:

$$Mv_i = \sqrt{Mv_x^2 + Mv_y^2}$$

With all of T displacement $Mv_i$ values sequenced from large to small, the value of $Mv_i$ (i=5%*T) which is at the location of the first 5%*T is taken as the reference value Mv_Base, and the motion probability value of each edge pixel point Ei(x,y) can be computed from the formula:

$$Mp(i) = \min\left(\frac{Mv_i}{\max(Mv\_Base, 1)}, 1.0\right)$$

$$(i = 0, 1, \ldots, T-1)$$

Step 52: computing the descriptive attribute information of each of the small regions. The attribute information can be divided into three types, the first type is three kinds of attributes for characterizing the internal portion of each region: color distribution attribute, grey scale distribution attribute, and motion information (comprising motion vector and edge point motion probability) attribute; the second type is three attributes for characterizing the differences between any two regions in adjacent spatial locations: grey scale mean value difference attribute, color mean value difference attribute, and motion vector difference attribute; and the third type is three attributes for characterizing the common edge features between any two regions which have adjacent spatial locations: gradient strength attribute, the number of the edge points, and edge point motion probability attribute. Practically, in the pre-processing image module 42 and step 51 for extracting the motion information of the small regions, each of the attribute information of three types of the descriptive attribute information has been computed. In the present step, the attributes computed previously are further summed up as three types of descriptive attributes, each type of the descriptive attributes comprising three kinds of descriptive attribute information. The following table can indicates simply these descriptive attributes:

TABLE 1

| First type attribute | Second type attribute | Third type attribute |
| --- | --- | --- |
| Color distribution | Color mean value difference | Gradient strength |
| Grey scale distribution | Grey scale mean value difference | The number of edge points |
| Motion information | Motion vector difference | Edge point motion probability |

Figure 7:
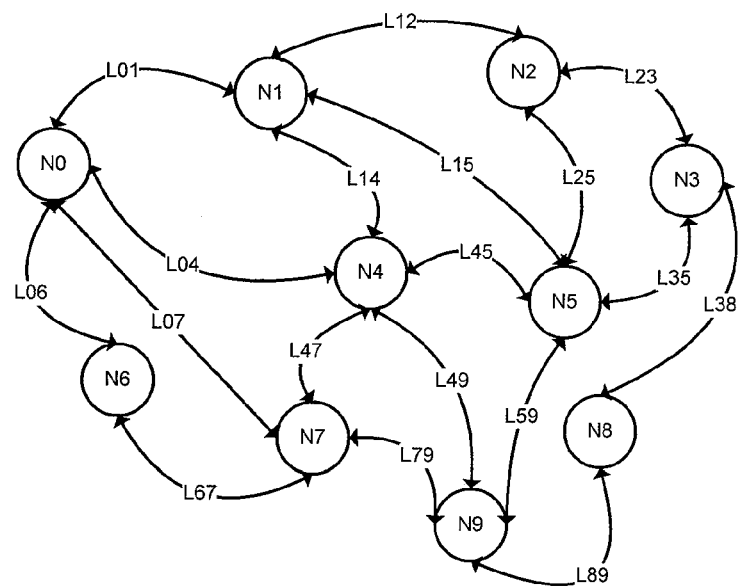
FIG. 7 is a schematic diagram of the step of creating a region neighboring diagram as shown in FIG. 5.

Step 53: creating region neighboring diagram of the small regions. After computing three types of attributes of each small region, the region neighboring diagram can be created based on the three types of attributes and the relationship of the spatial locations of the small regions. FIG. 7 shows a schematic diagram of a region neighboring diagram, each closed small region Ri (i=0,1, ... ) surrounding by black lines as shown in FIG. 6 is indicated by node Ni in FIG. 7, and the first type of attribute information is stored in the node Ni. If two nodes Ni and Nj are located adjacently in the space, then a bi-directional connecting arc Lij can be created. The second type and the third type attribute information are stored in the bi-directional connecting arc Lij.

Step 54: combining the small regions into large regions. In the present step, the combination of the small regions into large regions is completed via the region neighboring diagram by combining three types of information describing the region attributes, and using a region combination algorithm. Different from the region combination algorithm of the existing region combination based on single information or the region combination of single step, the embodiment of the invention uses a region combination method of combining multiple steps, multiple-attribute-information. Corresponding to different combination steps, a method that some attributes are selected as the main factors, and the other attributes as the auxiliary ones is used. The respective information can be utilized evenly in the entire combination procedure by different attributes emphasized in different combination steps, wrong segmenting due to the faulty of any single information can be avoid. The specific steps are as follows:

the first step: the small regions which have similar first type attribute information are combined, and are sequenced according to the first type attribute information, those having more similar attribute information will be combined firstly (however, the restriction condition is that the similarity of the second type, the third type attribute information should also reach a predetermined value), until the similarity of the first attribute information of the respective small regions is less than a predetermined value;

the second step: a similar method as that in the first step is used to combine the small regions having similar second type attribute information, with the restriction condition that the similarity of the first type, the third type attribute information also reaches a predetermined value;

the third step: a similar method as that in the first step is used to combine the small regions having similar third type attribute information, with the restriction condition that the similarity of the first type, the second type attribute information also reaches a predetermined value.

For example, for two small regions Ri and Rj, if the attribute information thereof is, respectively, Pi(m) and Pj(m) (m=1,2,3, representing the first type, the second type, the third type attribute information, respectively), then the smaller the similarity value $|P_i(m)-P_j(m)|$ is, the more similar the attribute information is, and the more earlier should they be combined.

The region combination step 54 is completed by executing the above step, it is noted that the sequence of executing these steps is optional without any specific order. Other sequence, such as the third step, the second step, the first step is also feasible.

Figure 8:
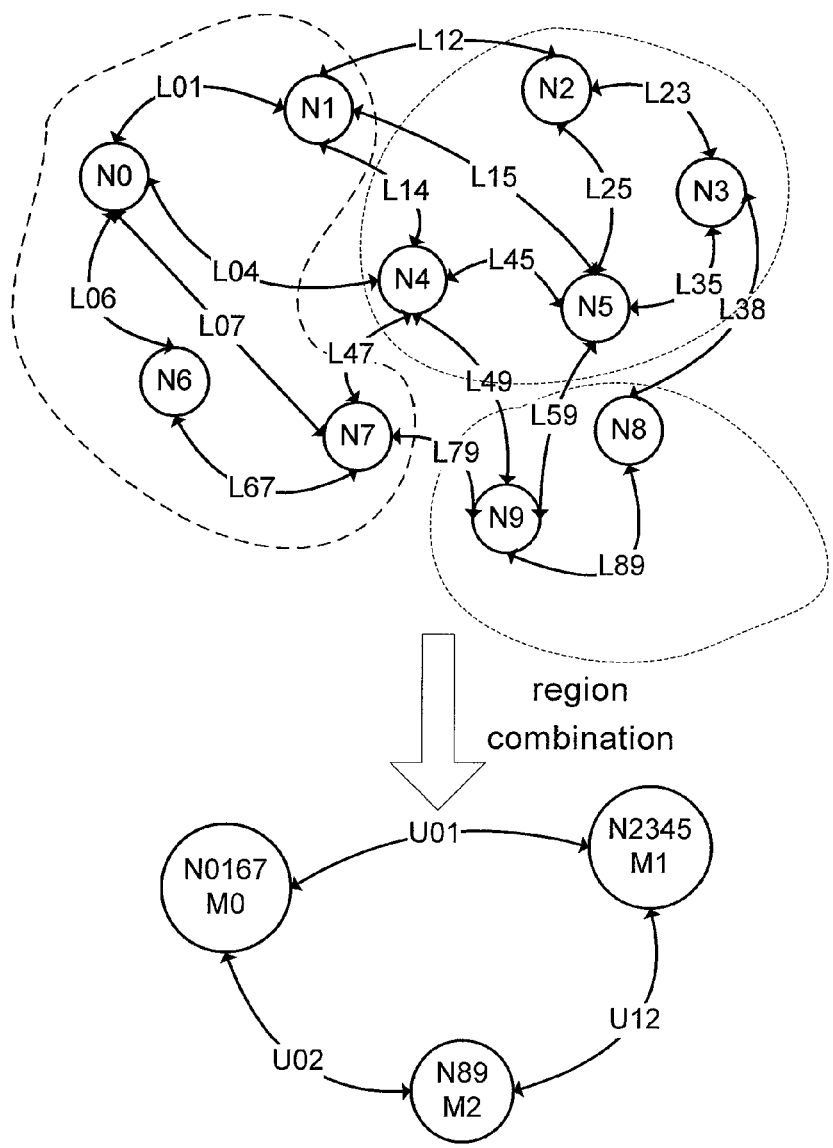
FIG. 8 is a schematic diagram of the step of combining the regions as shown in FIG. 5.

FIG. 8 is a schematic diagram showing the combination from small regions to large regions. 10 nodes N0~N9 indicating the small regions at the upper part of FIG. 8 is combined into 3 new nodes indicating the large regions based on the above region combination step. The node N0 167/M0 is obtained by combining the nodes N0, N1, N6, N7. The node N2345/M1 is obtained by combining the nodes N2, N3, N4, N5. The node N89/M2 is obtained by combining the nodes N8 and N9. That is, the large region M0 is obtained by combining small regions N0, N1, N6, N7, the large region M1 is obtained by combining small regions N2, N3, N4, N5, and the large region M1 is obtained by combining small regions N8 and N9.

Figure 9:
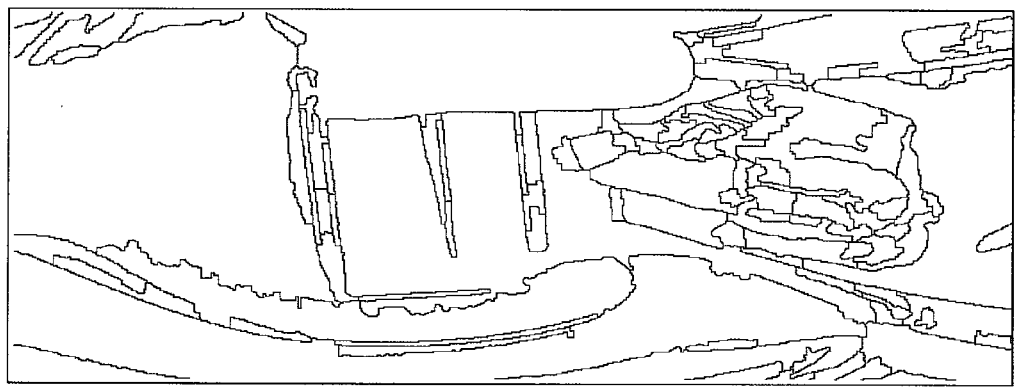
FIG. 9 is a large region segmentation diagram after combining the small region segmentation diagram as shown in FIG. 6.

FIG. 9 is a large region segmentation diagram after combining the small region segmentation diagrams as shown in FIG. 6 in a practical application. By comparing FIG. 6 and FIG. 9, it can be seen that the large regions in FIG. 9 is obtained by combining several small regions which are adjacent spatially in FIG. 6. Concerning describing objects, each of the regions in FIG. 9 can be viewed more intuitively by the human eyes than each of the regions in FIG. 6, so that it establishes a base for extracting motion region in the next step. The following results can be obtained after completing the region combination step 54: any pixel point of the human body and pixel point of non-human body do not exist in the same region, any two pixel points of different human body do not exist in the same region, two pixel points having significant difference in the background do not appear in the same region, and the total number of the image segmentation regions is as little as possible (normally, less than 100).

Step 55: tagging and mapping the small region. After completing the region combination, the tags of the small regions belonging to the same large region are mapped to the same tag.

Figure 10:
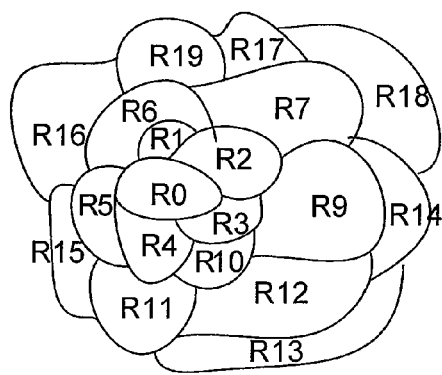
FIG. 10 is schematic diagram for counting the motion vector of the large region.

Step 56: computing the motion information of each large region. The motion information of each large region comprises: the motion vector inside the region and the motion probability value of the common boundary between any two adjacent regions. This motion information can be computed easily from the motion information of the small region obtained by step 51. It is noted that when combining k small regions R(j)(j=1, . . . ,k) to a large region M(i), the motion vector thereof equals to the mean value of all of the motion vectors of the small regions at the periphery of the large region (rather, not the mean value of the motion vectors of all the small regions within the large region). For example, as shown in FIG. 10, the large region is combined by R0-R19, the motion vector of the large region is a mean value of the motion vectors of the small regions R11, R13, R14, R15, R16, R17, R18 and R19 at the boundary, and the motion probability value between any two large regions M(m) and M(n) is the mean value of the motion probability values of all of the common boundary points.

Figure 11:
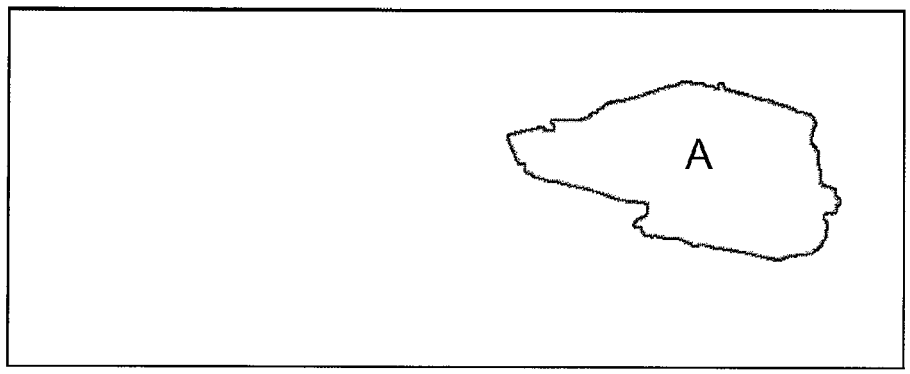
FIG. 11 is a schematic diagram of a motion region extracted from FIG. 9.

Step 57: extracting the motion region. That is, which regions in the image are the motion regions and which are the background regions are distinguished thereby the motion regions can be extracted. Any minimum energy mathematic model for realizing global optimization can be used in the invention to complete the extraction of the motion regions. For example, a solving method of high confidence first (HCF), which is proposed to solve Markov optimization problems, can be used. Meanwhile, referring to FIG. 9 and FIG. 11, after the present step, a motion region A as shown in FIG. 11 can be extracted from FIG. 9.

Step 58: verifying the target region. That is, whether the motion region is a legal target region (a human body region in this embodiment, hereinafter referred to as human body region) or not is verified. The conventional solving strategy is to use a method in which the simple morphologic is incorporated with the target region size of the human body to verify whether each region is human body or not, and to determine the possible human body amount in separated regions. This method is very effective under the condition that the gesture is substantially constant when the human body passes by the camera, however, under the condition that the gesture of the human body changes significantly, the verification of the human body region cannot be completed. In order to overcome the problem, a elastic match method is used in the invention to verify whether the motion region is a legal human body region or not. The method will be explained by incorporating the embodiment of the invention as follows, it is the basic capability of those skilled in the art to implement the present step after reading the following description.

The elastic match method comprises two stages: a human body region training stage and a motion region classifying stage.

In the training stage, a set of image regions having a quantity of TrainSum (normally, TrainSum is larger than 100) and involving human body regions is selected manually as a training image set, wherein these human body regions are motion regions having been determined as human body. The training image set is represented by two dimensional array Accm[x][y], wherein x and y in the array are the horizontal coordinate and vertical coordinate of the pixel points in the training image set, respectively. For each point P(x,y) in each training image, if it is located inside the human body region, then the value of Accm[x][y] corresponding to the position of two dimensional array Accm[x][y] will be incremented by 1.

In the motion region classifying stage, one accumulator A is set for each of the motion regions, the initial value thereof set as A=0. For each pixel Q(x, y) of all of the pixel points in the motion region, the value of the array element Accm[x][y] corresponding to the pixel point is added to the accumulator A to obtain an accumulated value. If the accumulated value>TrainSum*S*Threshold, and the total number of the pixel points S in a motion region conforms to Smin<S<Smax, then said region is a human body region, otherwise, it is not a human body region. Wherein the parameter Threshold indicates a critical coefficient for allowing to confirm a motion region being a human body region, which is normally within the range of 0.8~1.0. Smin and Smax indicate the lower limit and the upper limit of the total number of the pixel points in the human body region, respectively. These three parameters are preset parameters for adjusting manually.

Step 59: extracting all of the human body regions which have passed the verification for processing in the next step.

Figure 12:
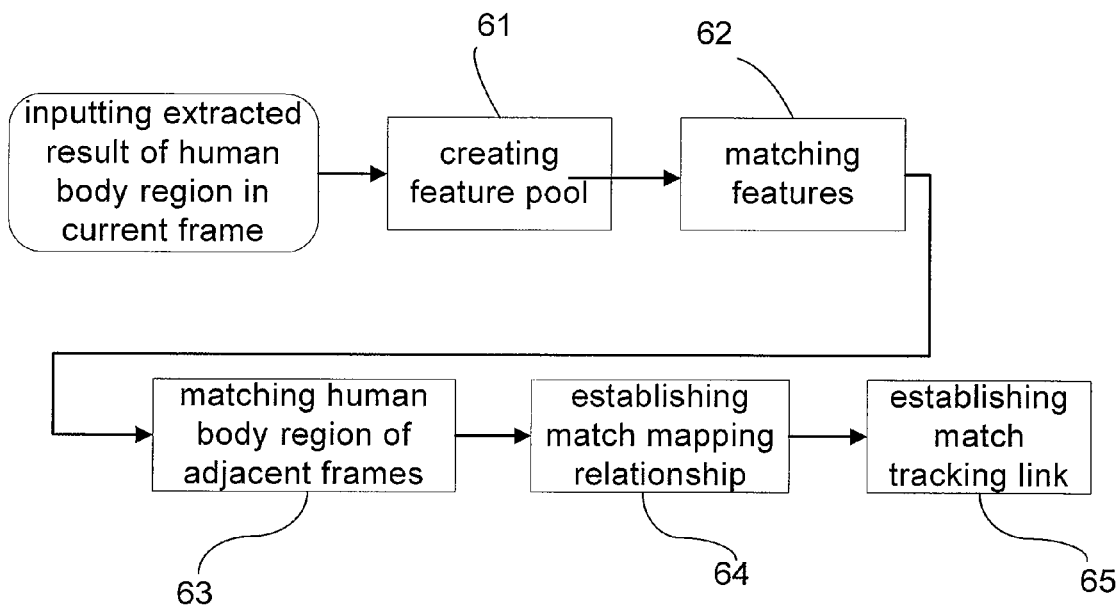
FIG. 12 is a flow chart of a step of tracking the human body of FIG. 4.

Returning to FIG. 4, the function of the tracking target step 44 is to track the extracted human body region in a procedure from the human body appearing to the human body disappearing. Referring to FIG. 12, the present step mainly executing target region matching upon the extracted human body regions based on online features selection to establish a match tracking link. The present step further comprises the following five sub-steps in turn as follows:

Step 61: establishing a feature pool comprising the features of human body. The feature pool may comprises partly or totally the following 11 features: area F0 of the human body region, minimum external rectangular F1, a ratio F2 of the area of the human body region to the area of the minimum external rectangular, coordinate C(x,y) F3 of the center of gravity, motion vector Mv(Mvx, Mvy) F4, a histogram of grey scale F5, color value F6, a histogram of gradient strength F7, main axis position F8, symmetry of human body region F9, ratio of the area of human body region to the perimeter F10, and the like. Based on the practical requirement, other features can be added optionally to the feature pool or the existing features can be deleted therefrom.

Step 62: matching the features: for all of the human body features in the features pool, the match degree between each of the human body features of the respective human body regions in the current frame and each of the human body features of the respective human body regions in the previous frame is computed respectively.

Step 63: matching the human body region of the adjacent frames. A synthetic match degree measure between the respective human body regions in the current frame and the respective human body regions in the previous frame is computed based on the match degree.

In the present embodiment, the synthetic match degree measure can be computed by using the following method: distance $d_i$ of all of the features in the feature pool is computed. The distance $d_i$ between the features may express the match degree, wherein the smaller the distance $d_i$ is, the higher the match degree is. These $d_i$ are sequenced from small to large, and the features corresponding to the first p % minimum $d_i$ value are selected, the selected features being $F_o^s, \ldots, F_p^s$ in turn, and the corresponding distances are $d_o^s, \ldots, d_p^s$ in turn. The distances of these features are weighted based on certain weight values, the weight values being $w_o^s, \ldots, w_p^s$ in turn, then the weighted distance is:

$$\bar{d} = \frac{\sum_{i=0}^{p} w_i^s \times d_i^s}{\sum_{i=0}^{p} w_i^s}$$

The smaller $\bar{d}$ is, the larger the synthetic match degree measure between two target regions, wherein the weight values $w_o^s, \ldots, w_p^s$ of these features are preset parameters for adjusting manually. A human body region in the current frame and a human body region in the previous frame having the maximum synthetic match degree measure with the human body region in the current frame are determined to be a successful pair of human body regions. For a human body region in the current frame and a human body region in the previous frame having a secondary maximum synthetic match degree measure with the human body region in the current frame, if the synthetic match degree measure is larger than a preset coefficient C for adjusting manually (0.8<C<1.0)*the maximum synthetic match degree measure, then it is also decided as a successful human body region pair.

Step 64: establishing a match mapping relationship. For an successfully matched human body region pair, a node is created to describe the attribute information of the human body region in the current frame, meanwhile, a bi-directional connecting arc is created to describe the associating relationship between the successfully matched human body region pairs. Under some conditions (for example, the human bodies passing by the camera gather or separate), one human body region in the current frame may be successfully matched with more than one human body regions in the previous frame, or more than one target regions in the current frame may be successfully matched with one target region in the previous frame.

Figure 13:
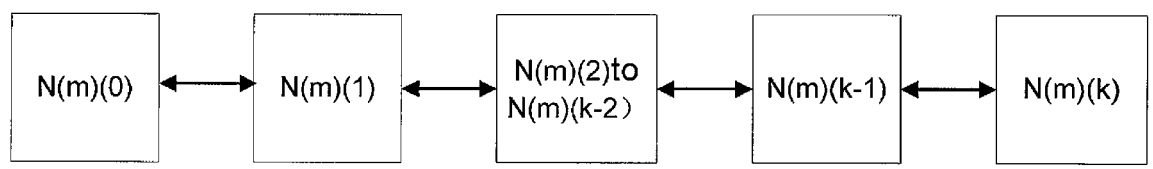
FIG. 13 is a schematic diagram of a match tracking link established by a procedure as shown in FIG. 12.

Step 65: establishing match tracking link. After establishing the match mapping relationship, a tracking link corresponding to the human body region in the previous frame can be found so that a human body region in the current frame adds to the tracking link of the corresponding human body region in the previous frame. If a corresponding tracking link cannot be found in the previous frame, then a new tracking link will be established. FIG. 13 is a schematic diagram of a tracking link. In FIG. 13, the node N(m)(k) indicates a newly added human body region in the current frame, wherein m is a tag of the tracking link, k indicates that said tracking link appears for k+1 times. All of the feature data in the feature pool is stored in N(m)(k), the bi-directional arrow between any two adjacent nodes indicates the mapping relationship between these two nodes. The distance di between the respective features and the weighted distance d are stored in the bi-directional arrow.

Figures 14A, 14B:
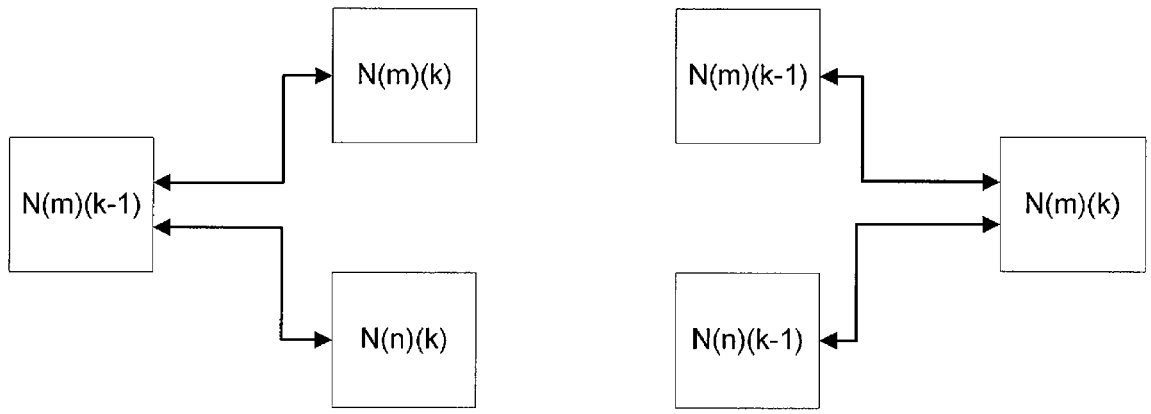
FIG. 14A is a schematic diagram of a branch of the match tracking link.
FIG. 14B is a schematic diagram of combining the match tracking link.

In order to adapt the pairs of one human body region to a plurality of human body regions or the pairs of a plurality of human body regions to one human body region, branches are allowed in the tracking link. As shown in FIG. 14A, the tracking link N(m)(k−1) in the previous frame can be divided into the tracking links N(m)(k) and N(n)(k) in the current frame, while as shown in FIG. 14B, two or more tracking links N(m)(k−1) and N(n)(k−1) in the previous frame can be combined to one tracking link N(m)(k). A plurality of pairs of match tracking links having a plurality of mapping relationships is established after completing the present step.

Returning to FIG. 4, the function of the step of counting target 45 is to count the number of people at the passageway going in and out the door, on the basis of the steps of segmenting target region 43 and tracking target 44. For all of the tracking links, the number of the human bodies and the motion direction of each human body corresponding to each tracking link beginning from the current frame are determined based on the human body region history tracks recorded by the tracking links.

Different from the human body counting method in the respective publicized articles (in those methods, normally, the motion direction of each human body is determined by the spatial displacement of the human body as an unique reference), the factor that the change of the gesture in the camera operation region during the people passing by is evident is considered in the invention, the motion of the people occurring in the operation region of the camera may not represent entirely the displacement of the human body in the space, under the conditions, such as the passengers get on or off the passenger vehicle, the motion of the people on the escalator, and the like, if the people has not walked to the step, then the human body represents a displacement in the space, in the procedure that the people walk from the horizontal ground to the step, except the displacement of the human body in the space, the image also represents a variation rule of the human body target changing gradually from small to large or changing gradually from large to small in a time period.

The following method is used in the invention to solve the counting of the number of the human bodies under above complicated human body motion procedure: s For each track link which has not been counted, it is decided whether it conforms to the counted track link by synthesizing the spatial displacement track and the rule of the human body target size changing by the time;

For each track link which has been counted, if the branches appear, then the statistic results of the branch links will be decided according to a method similar as the previously described step; meanwhile, the accuracy of the count results of the present track link is verified, if the previous statistic result of the present track link does not conform to the current statistic result, then the present statistic result will be used, and the previous statistic result will be modified simultaneously, until the tracking link leaves the operation region of the camera entirely. By using this method, the accuracy of distinguishing the motion direction of the human body can be increased significantly.

Returning to FIG. 3, FIG. 4, the above steps 42~45 will be cycled once when an image is received by the image recognition unit 13, the extracting of the human body region, the tracking of the human body region, and the counting of the human bodies are performed continuously, and finally, the count results are outputted (step 46), and displayed on the man-machine interface.

By comparing with the prior statistic method for counting the number of the people, the above scheme of the invention has the following advantages:

1. Firstly, at the aspect of extracting the human body region, the invention does not rely on the background and is substantially constant on the time axis, and a basic assumption that the motion region and the background are different significantly, while the information inside the frame of each image is mainly used, firstly, the entire image is segmented into several separated regions viewed intuitively by the human eyes, then whether each region is a motion region or not is decided, because the motion information is not used at the pixel stage in the invention, rather, the motion information is used at the region stage, so it is ensured that the human body region can be extracted correctly even the distribution of the illumination is extremely not equilibrium spatially, the change in a time period is complicated.

2. The scheme of the invention is not sensitive to the shadow produced by masking the imaging light of the camera by the human body target, so an extra method for eliminating the shadow is not required. The respective publicized articles require a method for eliminating the shadow, it cause directly that the precision of the statistic results of the number of the people decreases to a certain extent.

3. For the method of verifying whether the motion region is a human body region or not, the advantage of the invention is: under a condition that the change of the gesture is significant during the people passing by, a elastic match method is used to count the human body geometry to determine whether any motion region is a human body or not. While the publicized methods use simple morphologic filtering method or by using the human body area, width and height, and the like, to verify whether the motion region is a human body region or not, the human body verification problem under the condition that the change of the gesture is significant during the people passing by cannot be solved.

4. For the method of tracking the human body, the advantages of the invention with respect to the publicized method are:

(1) Under the condition that the distribution of the illumination is extremely not equilibrium spatially, the change in a time period is complicated, the change of a single feature assumed in advance is evident, the change of the gesture during the people goes by is evident, the single feature assumed in advance may disappear, it often causes the failure of the publicized feature match method of the human body, while a feature pool is used in the invention, by selecting on-line the most effective feature in the feature pool, the possibility of the ineffective of the feature match caused by that the distribution of the illumination is extremely not equilibrium spatially, the change in a time period is complicated, the change of the gesture during the people goes by is evident, and the like, can be avoided entirely. (2) A method for establishing track link is used in the invention, the match and track problems of the human body region can be overcome under the condition that the human bodies are interleaved and interacted, while the publicized methods have not taken any measures to process the interleave and interaction condition.

5. For the count method, the advantages of the invention with respect to the publicized human body count method are: only the displacement of the human body region in the horizontal space is considered by the respective publicized articles, and the tend of the change of the human body region size in the image space is ignored, under the condition that the gesture is changed during the people passing by, it is difficult to distinguish the motion direction of the human body. While not only the displacement of the human body in the horizontal space is considered in the scheme of the invention, but also the tend of the change of the human body region size in a time period during the motion of the human body region is considered. The counting of the number of the people under a complicated condition is solved by the invention by incorporating two kinds of information.

According to the above implementation method, the present system is installed on a passenger vehicle, by running and testing for a long time period and counting a plenty of sample data, extremely high statistic accuracy can be reached by the scheme of the invention. It is noted that the accurate statistic result can only be obtained when the number and the motion direction are accurate, otherwise, it is a wrong statistic result.

INDUSTRY APPLICABILITY

The invention can be used not only to count the number of the passengers on the passenger vehicle, but can be used widely also at the passageway of the public buildings, such as the stores, museums, exhibition halls, gymnasiums, and the like, the entries of long passages of escalators and corridors under the conventional application conditions. With respect to the passageway of the passenger vehicle for the passengers to get on or off, the passageway under these conditions has better environment illumination and the gestures of the passengers. According to an implementation scheme similar as that for the passenger vehicle, the statistic accuracy of the invention is higher than that of the passenger vehicle. Furthermore, the invention can be used for counting the number of non-human body targets, for non-human body targets, the counting steps is similar as that for the human body, that is, obtaining firstly the video image of the moving target, processing it, segmenting the region, extracting the moving target region, establishing match track link with the image of the previous frame, obtaining the motion track of the moving target, determining the number of the moving target, and counting.

What is claimed is:

1. A method for moving targets tracking and number counting, comprising the steps of,
   a). acquiring continuously video images comprising moving targets;
   b). acquiring the video image of a current frame, and pre-processing the video image of the current frame;
   c). performing target region segmenting upon the pre-processed image, and extracting a target region;
   d). matching the target region of the current frame obtained in step c) with the target region of the previous frame based on an online feature selection to establish a match tracking link; and
   e). determining the number of the targets corresponding to each match tracking link based on the target region tracks recorded by the match tracking link;
   f). acquiring the video images from step a) for each frame, performing step b)-step c), and accumulating the number of the targets corresponding to each tracking link,
   wherein the step of segmenting the target region in step c) comprising:
   c1). segmenting the pre-processed image into a plurality of separated first regions;
   c2). computing the motion information of each of the first regions;
   c3). determining and extracting the motion region based on the motion information;
   c4). verifying whether each of the motion regions is a target region or not; and
   c5). extracting the verified target region.

2. The method for moving targets tracking and number counting of claim 1, wherein in said step c1), the step of segmenting said image comprising:
   c11). segmenting the image into a plurality of second regions;
   c12). computing the motion information of each of the second regions;
   c13). computing the descriptive attribute information of each of the second regions;
   c14). creating a region neighboring diagram based on the spatial position relationships among the second regions and the descriptive attribute information; and
   c15). combining the second regions into a first region based on the descriptive attribute information and the region neighboring diagram.

3. The method for moving targets tracking and number counting of claim 2, wherein in said step c11), the method for segmenting the image into a plurality of second regions comprises watershed segmentation algorithm and seed point region growing algorithm.

4. The method for moving targets tracking and number counting of claim 2, wherein in said step c11), the internal pixels in each of the second regions possess uniform pixel attribute, the pixel attribute comprising color, gradient strength, whether an edge point or not, and edge response strength.

5. The method for moving targets tracking and number counting of claim 2, wherein in said step c12, the motion information in the second region comprises motion vector of the second region and the motion probability value of the edge pixels.

6. The method for moving targets tracking and number counting of claim 2, wherein in said step c13, the descriptive attribute information comprises:
   first type attributes for characterizing the internal attribute of each second region comprising color distribution attribute, grey scale distribution attribute, and motion information attribute;
   second type attributes for characterizing the difference between any two spatially adjacent second regions comprising a difference attribute of the grey scale mean values, a difference attribute of the color mean values, and a difference attribute of the motion vectors, between the second regions; and
   third type attributes for characterizing a common edge feature between any two spatially adjacent second regions comprising gradient strength attribute, the number of the edge points, and the motion probability attribute of the common edge points.

7. The method for moving targets tracking and number counting of claim 6, wherein in said step c14), the step of creating a region neighboring diagram further comprises:
   representing each of the second regions with a node, and storing the information of the first type attributes in the node;
   creating a bi-directional connecting arc between the nodes corresponding to two spatially adjacent second regions, and storing the information of the second type and the third type attributes in the connecting arc; and
   obtaining a region neighboring diagram of the bi-directional connecting arc comprising a plurality of the nodes and the connecting nodes.

8. The method for moving targets tracking and number counting of claim 6, wherein in said step c15), the step of combining the second regions into the first region comprises:
   under a restriction condition that the similarity of the second type attributes, the third type attributes reaches to a predetermined value, combining the second regions in a sequence according to the similarity of the first type attributes from large to small, until the similarity of first type attributes is smaller than a predetermined value;
   under a restriction condition that the similarity of the first type attributes, the third type attributes reaches to a predetermined value, combining the second regions in a sequence according to the similarity second type attributes from large to small, until the similarity of the second type attributes is smaller than a predetermined value; and
   under a restriction condition that the similarity of the first type attributes, the second type attributes reaches to a predetermined value, combining the second regions in a sequence according to the similarity of the third type attributes from large to small, until the similarity of the third type attributes is smaller than a predetermined value.

9. The method for moving targets tracking and number counting of claim 1, wherein in said step c4), the step of verifying whether each of the motion regions is target region or not uses a elastic matching method, wherein said elastic matching method comprises:
   a training stage step comprising: selecting a set of image regions of a quantity TrainSum which comprise target regions as a training image set; describing the training image being represented by two dimensional array Accm[x] [y], wherein x and y in the array are the horizontal coordinate and vertical coordinate of the pixels in the training image set, respectively; for each point P(x,y) in each training image, if it is located inside the target region, increasing the value of the element Accm[x][y] corresponding to two dimensional array Aecm by 1; and
   a motion region classifying step comprising: setting an accumulator A for each of the motion regions, the initial value of which set as A=0; for each of all of the pixels Q(x, y) in the motion region, adding the value of the numerical array element Accm[x][y] corresponding to the pixel to the accumulator A to obtain an accumulated value; if the accumulated value>TrainSum* S*Threshold, and the total number of the pixels S conforms to Smin<S<Smax, determining said region as a target region, otherwise, determining said region not as a target region;
   wherein the parameter Threshold indicates a critical coefficient for allowing to confirm a motion region being a target region, and Smin and Smax indicate the lower limit and the upper limit of the total number of the pixels in the target region, respectively.

10. The method for moving targets tracking and number counting of claim 1, wherein said step d) further comprising:
   d1. establishing a feature pool comprising a plurality of target features;
   d2. for at least part of the features in the feature pool, computing the match degree between each of the target features of the respective target region in the current frame and each of the target features of the respective target region in the previous frame;
   d3). computing a synthetic match degree measure between the respective target region in the current frame and the respective target region in the previous frame based on the match degrees;
   d4). establishing a match mapping relationship between a target region in the current frame and a previous frame's target region having the maximum synthetic match degree measure with respect to that in the current frame; and
   d5. establishing a match tracking link comprising the target region in the current frame based on the match mapping relationship.

11. The method for moving targets tracking and number counting of claim 10, wherein in said step d3), the step of computing synthetic match degree measure comprises: selecting a predetermined proportion of features in the feature pool, for which the match degree between the target region in the current frame and the target region in the previous frame are the highest, performing a weighted computation thereon, and obtaining the synthetic match degree measure between said two target regions.

12. The method for moving targets tracking and number counting of claim 10, wherein in said step d5), the step of establishing the match tracking link comprises: finding the tracking link corresponding to the target region in the previous frame based on the match mapping relationship of step d4), and adding the target region in the current frame to the tracking link corresponding to the target region in the previous frame; and if the corresponding tracking link cannot be found in the previous frame, then establishing a new tracking link.

13. The method for moving targets tracking and number counting claim 1, wherein said step e) further comprises:

for each not counted tracking link, deciding whether it is a tracking link suitable for counting based on the spatial displacement track of the target and the variation rule of the target size over time; and for each counted tracking link, verifying the accuracy of the counting result of the tracking link, if the previous counting of the tracking link is not consistent with the current counting, then using the current counting, meanwhile, modifying the previous count result, until the tracking link leaves entirely from the image acquisition region.

\* \* \* \* \*